US011862393B2

United States Patent
Van Delden et al.

(10) Patent No.: US 11,862,393 B2
(45) Date of Patent: Jan. 2, 2024

(54) COIL ASSEMBLY AND ITS USE IN A VALVE

(71) Applicant: Mahle International GmbH, Stuttgart (DE)

(72) Inventors: Jeffrey Van Delden, Stuttgart (DE); Matthias Lindenberg, Stuttgart (DE); Florian Wetzel, Baltmannsweiler (DE)

(73) Assignee: Mahle International GmbH

( * ) Notice: Subject to any disclaimer, the term of this patent is extended or adjusted under 35 U.S.C. 154(b) by 68 days.

(21) Appl. No.: 17/540,234

(22) Filed: Dec. 2, 2021

(65) Prior Publication Data

US 2022/0181058 A1 Jun. 9, 2022

(30) Foreign Application Priority Data

Dec. 3, 2020 (DE) .......................... 102020215259.4

(51) Int. Cl.
*F16K 31/04* (2006.01)
*H01F 7/08* (2006.01)
(Continued)

(52) U.S. Cl.
CPC ............. *H01F 7/081* (2013.01); *F16K 31/04* (2013.01); *F16K 31/042* (2013.01); *F16K 31/105* (2013.01); *F16K 31/0675* (2013.01)

(58) Field of Classification Search
CPC ...... F16K 31/04; F16K 31/042; F16K 31/105; H02K 1/145; H02K 49/106; H01F 5/02;
(Continued)

(56) References Cited

U.S. PATENT DOCUMENTS 4,255,681 A * 3/1981 Gerber ................. H02K 21/145
310/40 MM
4,714,853 A * 12/1987 Palmero ............... H02K 21/125
310/257
(Continued)

FOREIGN PATENT DOCUMENTS

DE     10147364 A1   5/2002
DE     60216188 T2   9/2007
(Continued)

OTHER PUBLICATIONS

English abstract for DE-102011052917.

*Primary Examiner* — Matthew W Jellett
(74) *Attorney, Agent, or Firm* — Fishman Stewart PLLC

(57) ABSTRACT

A coil assembly, e.g., for use a valve, is disclosed. The coil assembly includes a coil arrangement including at least one electrically energizable coil, a coil ring carrier receiving the coil arrangement, and a flux conducting device for conducting magnetic field lines of a magnetic field provided via the coil arrangement. The flux conducting device includes a one-piece ferromagnetic pole ring that includes a ring base plate and a plurality of pole ring outer teeth arranged on an outer edge of the ring base plate and angularly bent over on fold-over outer edge regions of the ring base plate. The flux conducting device further includes a one-piece ferromagnetic counter-pole ring that includes a counter-ring base plate and a plurality of counter-pole ring outer teeth arranged on a counter-outer edge of the counter-ring base plate and angularly bent over on counter-fold-over outer edge regions of the counter-ring base plate.

20 Claims, 9 Drawing Sheets

(51) Int. Cl.
*F16K 31/10* (2006.01)
*F16K 31/06* (2006.01)

(58) Field of Classification Search
CPC ............... H01F 7/081; H01F 2007/062; H01F 2007/083
See application file for complete search history.

(56) References Cited

U.S. PATENT DOCUMENTS

| | | | | |
|---|---|---|---|---|
| 4,942,325 | A * | 7/1990 | Fukaya | H02K 1/145 |
| | | | | 310/257 |
| 5,313,125 | A * | 5/1994 | Bosman | H02K 5/225 |
| | | | | 310/49.18 |
| 5,808,390 | A * | 9/1998 | Miyazawa | H02K 1/18 |
| | | | | 310/152 |
| 5,986,379 | A * | 11/1999 | Hollenbeck | H02K 29/08 |
| | | | | 310/68 B |
| 6,492,751 | B1 * | 12/2002 | Ineson | H02K 37/14 |
| | | | | 310/71 |
| 6,710,503 | B2 | 3/2004 | Yamawaki et al. | |
| 7,165,313 | B2 * | 1/2007 | Haenni | H02K 1/145 |
| | | | | 29/598 |
| 7,692,355 | B2 * | 4/2010 | Ihle | H02K 5/02 |
| | | | | 310/43 |
| 2002/0038983 | A1 | 4/2002 | Lin et al. | |
| 2007/0138901 | A1 * | 6/2007 | Bin | H02K 37/14 |
| | | | | 310/49.18 |
| 2011/0285217 | A1 * | 11/2011 | Kinpara | H02K 1/145 |
| | | | | 310/49.15 |

FOREIGN PATENT DOCUMENTS

| | | |
|---|---|---|
| DE | 102011052917 A1 | 3/2012 |
| EP | 0412569 A1 | 2/1991 |
| EP | 0978931 A1 | 2/2000 |
| EP | 1359656 A1 | 11/2003 |
| EP | 2290786 A2 | 3/2011 |

* cited by examiner

COIL ASSEMBLY AND ITS USE IN A VALVE

CROSS-REFERENCE TO RELATED APPLICATION

This application claims priority German Application No. DE 10 2020 215 259.4 filed on Dec. 3, 2020, the contents of which are hereby incorporated by reference in its entirety.

TECHNICAL FIELD

The invention relates to a coil assembly. The invention also relates to a use of this coil assembly in a valve.

BACKGROUND

Coil assemblies of this type are thoroughly known from the documents EP 2 290 786 B1, US 2011/285217 A1, US 2007/138901 A1 and EP 1 359 656 A1. Disadvantageous in these coil assemblies is that during their assembly relatively high joining forces have to be exerted and at the same time relatively strict requirements regarding accurate positioning of the components have to be fulfilled. Because of this, the known coil assemblies are relatively cost-intensive in the production.

The object of the invention therefore consists in providing an improved or at least another embodiment for a coil assembly. In particular, the object also consists in stating a use of this coil assembly, a production method for this coil assembly and a valve having this coil assembly.

With the present invention, these objects are solved in particular through the subjects of the independent claim(s). Advantageous embodiments are subject of the dependent claims and of the description.

SUMMARY

The basic idea of the invention consists in arranging the components of a flux conducting device of the coil assembly utilised for conducting magnetic field lines of a magnetic field in an axial direction free of contact with one another and, elastically preloaded in a radial direction, tightly clamp the same components laterally to one another.

For this purpose, a coil assembly is provided which is equipped with a coil arrangement comprising at least one electrically energizable coil of a multiplicity of metallic individual wire windings, having a circumferential coil ring carrier with respect to a coil centre axis of the coil receiving this coil arrangement and having a flux conducting device for conducting magnetic field lines of a magnetic field provided by means of the coil arrangement. The flux conducting device is configured in multiple parts. Initially it has a one-piece ferromagnetic pole ring of a ferromagnetic material. The same has a ring base plate and multiple pole ring outer teeth evenly distributed in the circumferential direction round about a longitudinal centre axis of the pole ring which are integrally arranged on an outer edge of the ring base plate that is oriented with respect to the longitudinal centre axis radially to the outside and which are angularly bent over on fold-over outer edge regions of the ring base plate. In addition, the ring base plate practically has a central clearance which completely penetrates the ring base plate in the direction of the longitudinal centre axis. Furthermore, the flux conducting device has a one-piece ferromagnetic counter-pole ring of a ferromagnetic material. The same has a counter-ring base plate and multiple counter-pole ring outer teeth evenly distributed in the circumferential direction round about a counter-longitudinal centre axis of the counter-pole ring which are integrally arranged on a counter-outer edge of the counter-ring base plate that is oriented with respect to the counter-longitudinal centre axis radially to the outside and which are angularly bent over on counter-fold-over outer edge regions of the counter-ring base plate. Practically, the counter-ring base plate additionally has a central clearance referred to as counter-clearance, which completely penetrates the counter-ring base plate in the direction of the counter-longitudinal centre axis.

In the assembled state of the coil assembly, the pole ring and the counter-pole ring are aligned coaxially to one another and to a main longitudinal centre axis of the coil assembly and, in the axial direction of this main longitudinal centre axis, are arranged at a longitudinal distance from one another. By way of this, a coil receiving ring space is formed or delimited between them, in which the coil arrangement and the coil ring carrier are touchingly arranged all-round. It is substantial that the said pole ring outer teeth and the said counter-pole ring outer teeth are intermeshed in the assembled state of the coil assembly so that:

the pole ring outer teeth are arranged in the axial direction free of contact on the counter-ring base plate and, elastically preloaded, are clamped laterally touchingly on the counter-ring base plate in a radial direction oriented transversely with respect to the main longitudinal axis, and the counter-pole ring outer teeth are arranged free of contact on the ring base plate in a counter-axial direction that is opposite with respect to the axial direction and, elastically preloaded in the radial direction, are clamped on the ring base plate in a laterally touching manner.

The lateral clamping of the pole ring outer teeth on the counter-ring base plate and of the counter-pole ring outer teeth on the ring base plate causes the pole ring and the counter-pole ring having mechanical contact with one another, as a result of which an optimal conduction of the magnetic field lines of the magnetic field provided by means of the coil arrangement is realised. By way of this, the coil assembly according to the invention can be operated relatively efficiently. Furthermore, a relatively favourable mounting of the coil assembly according to the invention is possible through the provided lateral clamping in the radial direction, since neither relatively strict requirements on an accurate positioning of the components of the coil assembly relative to one another more relatively high joining forces for joining the same components are necessary. Instead, pole ring and counter-pole ring can be slid on to one another for example in the axial direction. As a result, a coil arrangement is thus provided which unites an optimal conduction of magnetic field lines with favourable mounting characteristics.

The fact that the pole ring outer teeth are arranged in the axial direction free of contact on the counter-ring base plate can mean that, seen in the axial direction, no components of the coil assembly, in particular of the counter-pole ring or its counter-ring base plate, touchingly butt-up against the axial end faces of the pole ring outer teeth or against the free tooth ends of the pole ring outer teeth. The fact that the counter-pole ring outer teeth are arranged free of contact on the ring base plate in the counter-axial direction can mean that seen in the counter-axial direction, no components of the coil assembly, in particular the pole ring or its ring base plate, touchingly butt-up against the counter-axial end faces of the counter-pole ring outer teeth or against the free tooth ends of the counter-pole ring outer teeth. By way of the said lateral clamping in the radial direction with elastic preload in the same direction, a relative movement of the pole ring relative to the counter-pole ring is blocked by adhesive friction between the components involved in the clamping. The radial direction can be oriented transversely or at a right angle with respect to the main longitudinal centre axis.

Practically, the said longitudinal centre axis of the pole ring runs centrically through the clearance of the pole ring and, furthermore, stands up perpendicularly with respect to the ring base plate of the pole ring. The said counter-longitudinal centre axis of the counter-pole ring practically runs centrically through the counter-clearance of the counter-pole ring and, furthermore, stands up perpendicularly with respect to the counter-ring base plate of the counter-pole ring. The said main longitudinal centre axis of the coil assembly practically extends centrically through the same.

In the assembled state of the coil assembly, in which the coil assembly is ready for operation, the main longitudinal centre axis, the longitudinal centre axis, the counter-longitudinal centre axis, the coil centre axis of the coil and a coil ring carrier centre axis of the coil ring carrier still to be mentioned in the following, are practically oriented coaxially to one another. By way of this, the coil assembly can be imparted an altogether annular shape.

Practically, the pole ring outer teeth can be clamped to the counter-ring base plate without gap, in particular free of an air gap, and linearly or areally. Further practically, the counter-pole ring outer teeth are also clamped to the ring base plate without gap and linearly or areally. By a counter-pole ring outer tooth or a pole ring outer tooth linearly or areally butting up against the ring base plate or the counter-ring base plate, a relatively good mechanical contact between these components can be established, as a result of which an optimal conduction of the magnetic field lines of the magnetic field provided by means of the coil arrangement can be ensured. In particular, interfering air gaps can be prevented. The lateral clamping can be configured so that between the pole ring outer teeth and the counter-ring base plate as well as the counter-pole ring outer teeth and the ring base plate, there is no air gap.

Practically, at least between two fold-over outer edge regions of the ring base plate adjacent in the circumferential direction, a curvature-free clamping surface is formed. In the assembled state of the coil assembly, a counter-pole ring outer tooth is, elastically preloaded, clamped against the same. Furthermore, such a curvature-free counter-clamping surface can also be formed at least between two counter-fold-over outer edge regions adjacent in the counter-circumferential direction of the counter-ring base plate. In the assembled state of the coil assembly, a pole ring outer tooth can, elastically preloaded, be clamped to the same. The expression "curvature-free" is to mean that the clamping surfaces or counter-clamping surfaces are free of curvatures and distortions. Further practically, the pole ring outer teeth are clamped gap-free and linearly or areally, to a respective counter-clamping surface. The counter-pole ring outer teeth can also be clamped, gap-free and linearly or areally, to a clamping surface. In particular with a counter-pole ring outer tooth or a pole ring outer tooth areally butting up against a curvature-free clamping surface or counter-clamping surface a relatively good mechanical contact is provided, as a result of which an optimal conduction of the magnetic field lines of the magnetic field provided by means of the coil arrangement is realised.

Practically, the clamping surfaces project in the radial direction from the ring base plate towards the outside. This means they protrude in the radial direction over the ring base plate. The counter-clamping surfaces can also be configured projecting in the radial direction from the counter-ring base plate to the outside. This means they protrude in the radial direction over the counter-ring base plate. By way of this, separate surfaces, delimited from the ring base plate or the counter-ring base plate, for the pole ring outer teeth and the counter-pole ring outer teeth are created, against which the same can touchingly lie in a clamping manner.

Further practically, the ring base plate has two flat large ring surfaces oriented opposite to one another, a circumferential inner lateral surface relative to the longitudinal centre axis radially inside and a circumferential outer lateral surface radially outside with respect to the longitudinal centre axis, wherein the latter forms the outer edge of the ring base plate. Furthermore, the counter-ring base plate can have two counter-large ring surfaces oriented opposite to one another, a circumferential counter-inner lateral surface radially inside with respect to the counter-longitudinal centre axis and a circumferential counter-outer lateral surface radially outside with respect to the counter-longitudinal centre axis, wherein the latter forms the counter-outer edge of the counter-ring base plate. By way of this, an advantageous configuration of the respective ring base plate is stated. It is conceivable for example that the ring base plate and the counter-ring base plate are produced as same parts, are thus identical to one another.

The said clamping surfaces can be arranged on projections projecting in the circumferential direction between the fold-over outer edge regions and in the radial direction from the outer lateral surface of the ring base plate towards the outside, wherein the clamping surfaces are then each formed by front faces of these projections pointing in the radial direction towards the outside. For example, the respective projections can project a few millimetres with respect to the ring base plate. Furthermore, this can also be provided on the counter-clamping surfaces, namely: that the counter-clamping surfaces are arranged on counter-projections projecting in the counter-circumferential direction between the counter-fold-over outer edge regions and in the radial direction from the counter-outer lateral surface of the counter-ring base plate, wherein the counter-clamping surfaces are each formed by front faces of these counter-projections pointing in the radial direction towards the outside. The counter-projections can project a few millimetres with respect to the counter-ring base plate.

Between a fold-over outer edge region of the ring base plate and a clamping surface that is directly adjacent in the circumferential direction about the longitudinal centre axis, a circle-cylindrical transition region can be provided on the outer edge, which arc-shaped connects the fold-over outer edge region of the ring base-plate with a clamping surface.

Practically, the pole ring outer teeth and the counter-pole ring outer teeth can each be configured curvature-free, in particular flat and curvature-free. Furthermore, the pole ring outer teeth and the counter-pole ring outer teeth can each be formed by a flat body configured curvature-free. The expression "curvature-free" is to mean that the flat body is free of curvature and distortion, so that the respective flat bodies are quasi completely flat. The curvature-free or flat shape of the pole ring outer teeth and the counter-pole ring outer teeth simplifies the angling of the pole ring outer teeth and of the counter-pole ring outer teeth relative to the respective ring base plate, in comparison with pole ring outer teeth and counter-pole ring outer teeth embodied arched. Furthermore, the curvature-free or flat shape of the pole ring outer teeth and of the counter-pole ring outer teeth makes possible a relatively good mechanical contact with the respective base plate, as a result of which an optimal conduction of the magnetic field lines of the magnetic field provided by means of the coil arrangement can be ensured. The conduction of the magnetic field lines of the magnetic field can be further improved when the pole ring outer teeth and counter-pole ring outer teeth configured curvature-free or flat are clamped to curvature-free clamping surfaces or counter-clamping surfaces.

Further practically, the pole ring outer teeth, in particular the flat bodies of these, are each integrally connected on the foot side to the outer edge of the ring base plate and have or form a free tooth end on the head side. The same has a mounting bevel located inside in the radial direction. Furthermore, the counter-pole ring outer teeth, in particular the flat bodies of the same, are each integrally connected on the foot side to the counter-outer edge of the counter-ring base plate and have or form a free counter-tooth end on the head side, which has a mounting bevel located inside in the radial direction. At least one or all mounting bevels can be realised by a multi-way chamfer. At least one or all mounting bevels can be produced by stamping. The mounting bevels facilitate the mounting of the coil assembly, in that, during the mounting of the coil assembly come into contact with the outer edge of the ring base plate or with the counter-outer edge of the counter-ring base plate, wherein the pole ring outer teeth and the counter-pole ring outer teeth, when a corresponding joining force is imposed, each are elastically deflected in the radial direction towards the outside and slide off on the ring base plate or the counter-ring base plate so that the pole ring outer teeth and the counter-pole ring outer teeth, in the assembled state, then lie clamped with elastic preload in the radial direction, against the ring base plate or the counter-ring base plate.

Further practically, the pole ring outer teeth, in the assembled state of the coil assembly, can protrude in the axial direction over the counter-ring base plate and the counter-pole ring outer teeth in the counter-axial direction over the ring base plate. By way of this, a particularly compact design of the coil assembly is possible.

Practically, the mounting bevels of the pole ring outer teeth protrude, in the assembled state of the coil assembly, in the axial direction over the counter-ring base plate. In the assembled state of the coil assembly, the mounting bevels of the counter-pole ring outer teeth can also protrude over the ring base plate in the counter-axial direction. By way of this, a particularly compact design of the coil assembly is possible.

Practically, the pole ring and/or the counter-pole ring have an omission or a clearance for a coil supply connection for the energy supply of the coil arrangement. The clearance can be realised for example by omitting a pole ring outer tooth and an adjacent counter-pole ring outer tooth.

Further practically, the ring base plate can comprise a rotation positive-locking cut-out penetrating the same at least in sections or completely for positioning the pole ring on the coil ring carrier. When the pole ring is fitted on to the coil ring carrier or in the assembled state of the coil assembly, the rotation positive-locking cut-out interacts with the coil ring carrier in such a manner that the pole ring is non-rotatably held on the coil ring carrier. By way of this, the ring base plate is locked on the coil ring carrier in a circumferential direction. It is obviously also conceivable that the counter-ring base plate is equipped with a rotation positive-locking cut-out.

Furthermore, the pole ring can comprise in the region of the central clearance, multiple pole ring inner teeth projecting into this clearance at least in sections, which, evenly distributed in the circumferential direction round about the longitudinal centre axis of the pole ring, are arranged on an inner edge of the ring base plate which is oriented with respect to the longitudinal centre axis radially towards the inside, and each are angularly bent over at a fold-over inner edge region. Furthermore, the counter-pole ring can also comprise in the region of its central counter-clearance, multiple counter-pole ring inner teeth projecting into the central counter-clearance at least in sections, which, evenly distributed in the counter-circumferential direction round about the counter-longitudinal centre axis of the counter-pole ring, are arranged on a counter-inner edge of the counter-ring base plate oriented with respect to the counter-longitudinal centre axis radially to the inside and are each angularly bent over at a counter-fold-over inner edge region.

Furthermore, the pole ring inner teeth can be parallel with respect to the longitudinal centre axis or between them and the longitudinal centre axis, define an angle in the range greater than zero up to including 10°. By way of this, the pole ring inner teeth are bent over with respect to the ring base plate quasi by over 90° so that they can clamp tightly on the coil ring carrier, in particular in order to fix the pole ring on the coil ring carrier in the axial direction. The counter-pole ring inner teeth can also be parallel with respect to the counter-longitudinal centre axis, or between them and the counter-longitudinal centre axis define an angle in the range greater than zero up to including 10°. By way of this, the counter-pole ring inner teeth are bent over with respect to the counter-ring base plate quasi by over 90° so that they can clamp tightly on the coil ring carrier, in particular in order to fix the counter-pole ring on the coil ring carrier in the axial direction.

It is also conceivable that the pole ring outer teeth of a pole ring each comprise a curvature or an arch in order to thereby increase the contact pressure of the pole ring outer teeth on to the counter-pole ring, so that the contact of these with the counter-pole ring is never interrupted. The respective curvature or arch of a pole-ring outer tooth is embodied by a curvature axis which, with respect to the longitudinal axis of the pole ring, is oriented transversely, in particular at a right angle.

It is also conceivable that the pole ring inner teeth of a pole ring each comprise a curvature or an arch, in order to thereby increase the contact pressure of the pole ring outer teeth on to the coil ring carrier, so that the contact of these with the coil ring carrier is never interrupted. Here, the respective curvature or arch of a pole ring inner tooth is embodied about a curvature inner axis, which with respect to the longitudinal centre axis of the pole ring, is oriented transversely, in particular at a right angle.

The same can apply to the counter-pole ring: here it is also conceivable that the counter-pole ring outer teeth of a counter-pole ring each comprise a curvature or an arch in order to thereby increase the contact pressure of the counter-pole ring outer teeth on to the pole ring, so that the contact of these with the pole ring is never interrupted. The respective curvature or arch of a counter-pole ring outer tooth is embodied about a counter-curvature axis which, with respect to the counter-longitudinal axis of the counter-pole ring, is oriented transversely, in particular at a right angle.

It is also conceivable that the counter-pole ring inner teeth of a counter-pole ring each comprise a curvature or an arch in order to thereby increase the contact pressure of the counter-pole ring outer teeth on to the coil ring carrier, so that the contact of these with the coil ring carrier is never interrupted. The respective curvature or arch of a counter-pole ring inner tooth is embodied about a counter-curvature inner axis which, with respect to the counter-longitudinal centre axis of the counter-pole ring, is oriented transversely, in particular at a right angle.

Practically, the curvatures or arches also have the advantage that production tolerances and/or assembly tolerances as well as the individual elastic spring-back of a tooth can be offset.

Practically this can mean that the pole ring outer teeth each comprise a curvature or arch embodied about a curvature axis wherein the said curvature axes with respect to the longitudinal centre axis of the pole ring are each oriented at a right angle, and/or that the pole ring inner teeth each comprise a curvature or arch embodied about a curvature inner axis, wherein the said curvature inner axes are each oriented with respect to the longitudinal centre axis of the pole ring at a right angle, and/or in that the counter-pole ring outer teeth each comprise a curvature or arch embodied about a counter-curvature axis, wherein the said counter-curvature axes are each oriented with respect to the counter-longitudinal centre axis of the counter-pole ring at a right angle, and/or in that the counter-pole ring inner teeth each comprise a curvature or arch embodied about a counter-curvature inner axis, wherein the said counter-curvature inner axes are each oriented with respect to the counter-longitudinal centre axis of the counter-pole ring at a right angle.

Furthermore, the coil ring carrier can have a pair of coaxial flat coil ring plates arranged spaced apart from one another, which are material-integrally connected to one another by way of a circumferential side circumference wall of the coil ring carrier about a coil ring carrier centre axis of the coil ring carrier, wherein the side circumference wall is arranged in each case on coil ring plate inner edges of the coil ring plates located radially inside with respect to the coil ring carrier centre axis, so that the coil ring carrier forms or delimits a coil carrier receiving ring space for receiving the coil that is open radially towards the outside. Furthermore, the coil ring carrier has receiving pockets for the pole ring inner teeth and the counter-pole ring inner teeth that are open towards the inside in the radial direction. The receiving pockets are arranged on the side circumference wall in alternating order. They each have a pocket bottom that is angularly tilted with respect to the coil ring carrier centre axis, which are each framed by a pocket wall projecting away from the respective pocket bottom at least in sections.

The invention has the alternative or additional further basic idea of stating a use of the said coil assembly in a valve. Such a valve is equipped with an actuation device which comprises a coil assembly according to any one of the preceding claims and comprises an actuating member. The latter is driveable by means of the coil assembly to perform a linear or rotary operating movement.

Another basic idea of the invention can consists in stating a method for producing a pole ring or of a counter-pole ring for a coil assembly according to the preceding description. A corresponding production method is characterised in that a flat, circular plate blank is provided, in that this plate blank is formed by stamping and that the obtained plate blank semi-finished product is reshaped so that the pole ring outer teeth and pole ring inner teeth of the same are angularly bent over in a common direction. This has the advantage that the pole ring or the counter-pole ring can be produced in one piece and with only few operating steps.

For solving the object mentioned above, a valve having a coil assembly according to the preceding description is practically provided. Here, the coil assembly can be directly integrated or retrofitted in the valve.

In summary it remains to note: the present invention preferentially relates to a coil assembly having a coil arrangement comprising an electrically energizable coil, a coil ring carrier receiving the coil arrangement and a flux conducting device for conducting magnetic field lines of a magnetic field provided by means of the coil arrangement. The flux conducting device comprises a one-piece ferromagnetic pole ring and a counter-pole ring, which in the assembled state of the coil assembly form a coil receiving ring space between them, in which the coil arrangement and the coil ring carrier are arranged. It is substantial for the invention that the pole ring outer teeth and the counter-pole ring outer teeth are intermeshed in such a manner that:

the pole ring outer teeth are arranged on the counter-ring base plate free of contact in the axial direction and, elastically preloaded in the radial direction, are clamped on to the counter-ring base plate, and the counter-pole ring outer teeth are arranged on the ring base plate free of contact in the counter-axial direction and, elastically preloaded in the radial direction, are clamped on to the ring base plate.

Further important features and advantages of the invention are obtained from the subclaims, from the drawings and from the associated figure description by way of the drawings.

It is to be understood that the features mentioned above and still to be explained in the following cannot only be used in the respective combinations stated, but also in other combinations or by themselves without the scope of the present invention.

Preferred exemplary embodiments of the invention are shown in the drawings and are explained in more detail in the following description, wherein same reference numbers relate to same or similar or functionally same components.

BRIEF DESCRIPTION OF DRAWINGS

It shows, in each case schematically

DETAILED DESCRIPTION

FIG. 1 to 9 show a ring-shaped coil assembly altogether marked with the reference number 1, which is preferably employed individually or in multiples in valves in order to drive an actuation member of the actuation device of this valve in a linear or rotary operating movement as part of an actuation device of the respective valve. The energized coil assembly 1 can, for this purpose, provide for this purpose a magnetic field which is not illustrated in the figures, which interacts with the actuation member in order to drive the same to perform the operating movement.

Figure 1:
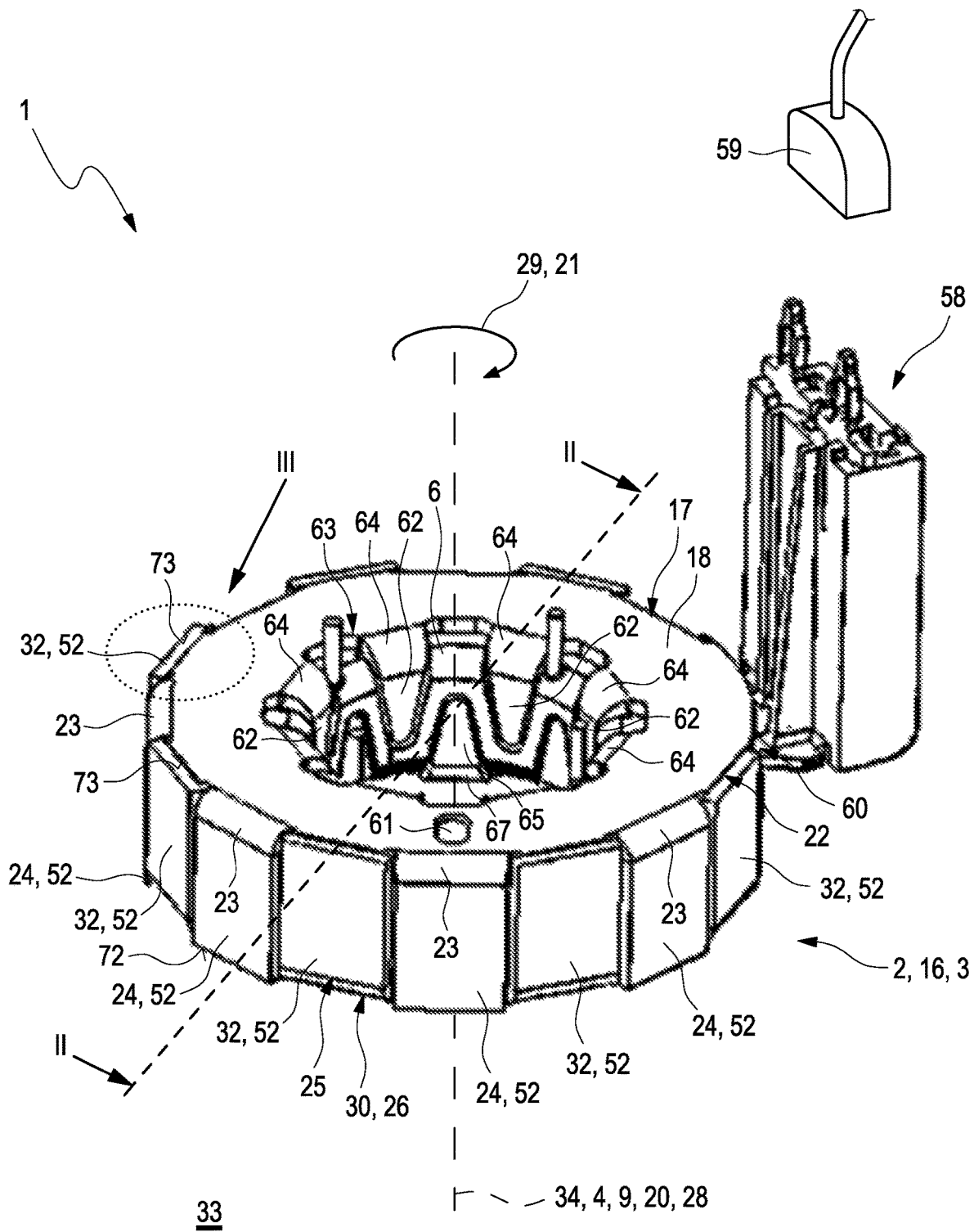
FIG. 1 a perspective view of a preferred exemplary embodiment of a coil assembly, FIG. 2 a longitudinal section through the coil assembly from FIG. 1 with view in the direction of arrows II entered there, FIG. 3 an extract of the coil assembly from FIG. 1 framed with dashed line in enlarged representation and with view in the direction of an arrow III entered there, FIG. 4 in a perspective view the pole ring of the coil assembly from FIG. 1, FIG. 5 in a perspective view of the counter-pole ring of the coil assembly from FIG. 1, FIG. 6 an extract of the pole ring of the coil assembly from FIG. 4 framed with dashed line in enlarged representation and with view in the direction of an arrow VI entered there, FIG. 7 an extract VII framed with dashed line of the coil assembly from FIG. 2 in enlarged representation, FIG. 8 an extract analogous to extract VII, however from a further preferred exemplary embodiment of a coil assembly, FIG. 9 a further embodiment of a coil assembly according to the invention.

FIG. 1 shows a perspective view of a preferred exemplary embodiment of the coil assembly 1. The coil assembly 1 is annular in shape and defines a central main longitudinal axis 34 entered with dashed line. The coil assembly 1 has a coil supply connection 58, on which exemplarily a connection cable 59 coupled with a supply device can be plugged on, in order to realise the energy supply, i.e. in particular energizing of the coil assembly 1. Furthermore, the coil assembly 1 has a coil arrangement 2 for providing the said magnetic field, the coil arrangement 2 comprising at least one electrically energizable coil 3 consisting of a multiplicity of circumferential metallic individual wire windings about a coil centre axis 4 of the coil 3, a coil ring carrier 6 receiving this coil arrangement 2 and a multi-part flux conducting device 16, which serves for conducting magnetic field lines of the magnetic field provided by means of the coil arrangement 6. It is at least conceivable that the coil arrangement 2 for optimising the magnetic field is equipped with more than one coil 3, for example two or three such coils 3 can be provided. Here, the coils 3, the coil ring carrier 6 and the flux conducting device 16 are axial to one another and thus define the said main longitudinal centre axis 34 of the coil assembly 1. By way of this, the said components of the coil assembly 1, except for the coil supply connection 58, have a common central main longitudinal centre axis 34, which with respect to the components of the coil assembly 1 can form a symmetry axis if applicable.

Figure 2:
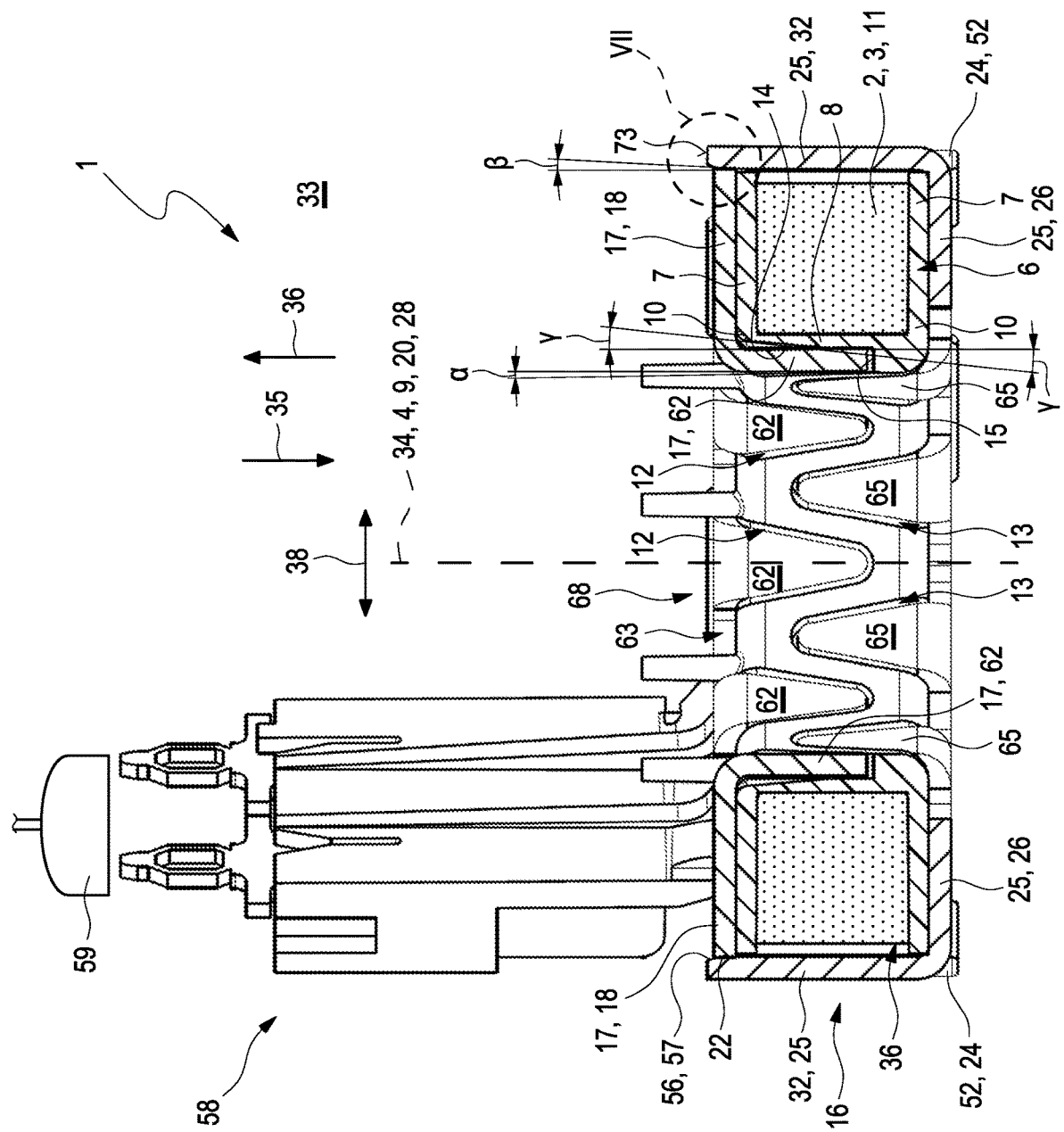

FIG. 2 shows a longitudinal section through the coil assembly 1 from FIG. 1 with view in the direction of arrows II entered there. This allows in particular viewing the coil ring carrier 6 in more detail. The same comprises a pair of coaxial flat coil ring plates 7 arranged with a longitudinal distance from one another, which are material-integrally connected to one another by way of a circumferential side circumference wall 8 of the coil ring carrier 6 about a coil ring carrier centre axis 9 of the coil ring carrier. Here, the side circumference wall 8 is each fixed to coil ring plate inner edges 10 of the two coil ring plates 7 located with respect to the coil ring carrier centre axis 9 radially inside, so that the coil ring carrier 6 forms or delimits a coil carrier receiving inner space 11 that is open radially to the outside for receiving the at least one coil 3 and, radially inside, a central passage 68 running coaxially to the coil ring carrier centre axis 9. Furthermore, the coil ring carrier 6 has receiving pockets 12, 13 oriented radially towards the inside which open into the passage 68 for inserting pole ring inner teeth 62 of a pole ring 17 of the flux conducting device 16 and counter-pole ring inner teeth 65 of a counter-pole ring 25 of the flux conducting device 16 explained in the following. The receiving pockets 12, 13 are arranged in alternating order round about the coil ring carrier centre axis 9 on the radial inner side of the side circumference wall 8 oriented towards the passage 68, so that in the circumferential direction about the coil ring carrier centre axis 9, a receiving pocket 12 for a pole ring inner tooth 62 of the pole ring 17 is always alternately followed by a receiving pocket 13 for a counter-pole ring inner tooth 65 of the counter-pole ring 25. As is noticeable, furthermore, in FIG. 2, each receiving pocket 12, 13 is equipped with a pocket bottom 14 that is angularly tilted with respect to the coil ring carrier centre axis 9, against which in each case a pole ring inner tooth 62 of the pole ring 17 or a counter-pole ring inner tooth 65 of the counter-pole ring 25 touchingly lies. For example, the pocket bottoms 14 are tilted with respect to the coil ring carrier centre axis 9 by angles 7 of greater than zero up to including 5°. Furthermore, each receiving pocket 12, 13 has a pocket wall 15 framing the respective pocket bottom 14 at least in sections projecting away from the respective pocket bottom 14. The respective receiving pockets 12, 13 are either embodied integrally on the coil ring carrier 6 or subsequently worked in by a machining method. The coil ring carrier 6 can be produced in particular from a plastic, a metal material coated with an insulating layer or a composite material.

The flux conducting device 16 noticeable in FIG. 2 in section has the purpose of conducting and forming, in particular bundling the magnetic field generated by means of the coil arrangement 2. For this purpose, it comprises, as indicated, a pole ring 17 and a counter-pole ring 25 exemplarily configured almost identically. Both the pole ring 17 and also the counter-pole ring 25 are produced in one piece and out of a material having ferromagnetic properties, suitable are for example alloys with contents of iron, cobalt and/or nickel. Exemplarily, it is a steel material, in particular a plate semi-finished product that has been stamped and reshaped.

Figure 4:
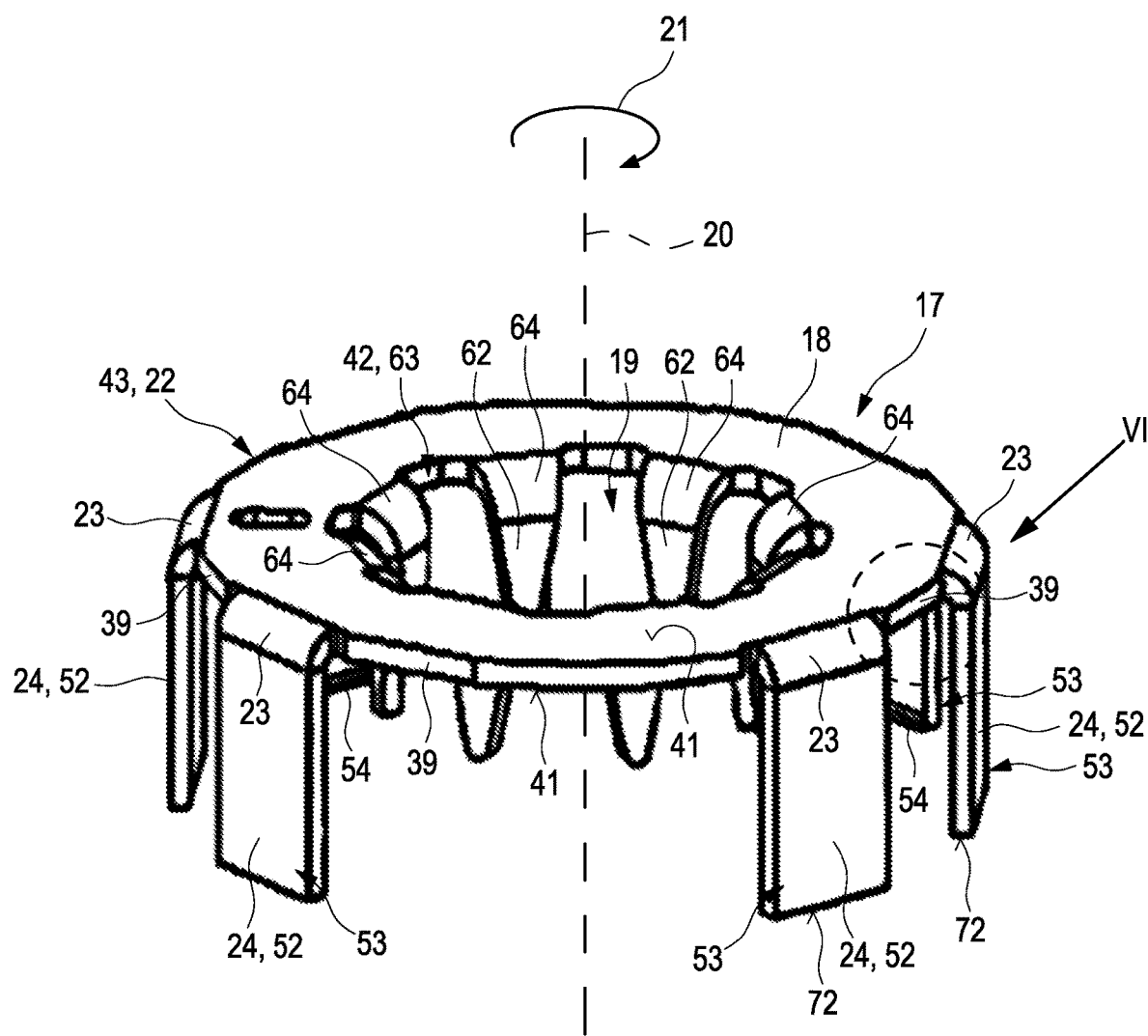

The pole ring 17 of the coil assembly 1 produced out of a steel plate shown in FIG. 4 in a perspective individual view has a ring base plate 18, which is centrally penetrated completely by a circular clearance 19. The ring base plate 18, furthermore, has multiple pole ring outer teeth 24 distributed round about a longitudinal centre axis 20 of the pole ring 17 exemplarily running centrically through the clearance 19 and which with respect to the ring base plate 18 stand up perpendicularly, arranged on an outer edge 22 of the ring base plate 18 that is oriented with respect to the longitudinal centre axis 20 radially to the outside and angularly bent over at fold-over outer edge regions 23 of the ring base plate 18. Exemplarily, the pole ring outer teeth 24 are bent over with respect to the longitudinal centre axis 20 by exactly 90°. Each of these pole ring outer teeth 24 is realised as a flat body 52, which on the foot side is integrally connected to the outer edge 22 of the ring base plate 18. On the head side, they each have a free tooth end 53. On these free tooth ends 53, a mounting bevel 54 each located radially inside is provided. These mounting bevels 54 are oriented with respect to the longitudinal centre axis 20 transversely, in particular at a right angle and can, furthermore, be each formed by a multi-way chamfer 57. The mounting bevels 54 facilitate the mounting of the coil assembly 1. The pole ring 17, furthermore, comprises in the region of its central clearance 19 multiple pole ring inner teeth 62, which, distributed round about the longitudinal centre axis 20 in the circumferential direction 21, are arranged on a circumferential inner edge 63 of the ring base plate 18 about the clearance 19 oriented with respect to the longitudinal centre axis 20 radially towards the inside, and are each angularly bent over on a fold-over inner edge region 64 of the ring base plate 18. Exemplarily, the pole ring inner teeth 62 are bent over in the same direction as the pole ring outer teeth 24 and with respect to the longitudinal centre axis 20 by exactly 90°. Exemplarily, deviating angles α can also be set, or angles between the pole ring inner teeth 62 and the longitudinal centre axis 20 in the range greater than zero up to including 10°.

Figure 5:
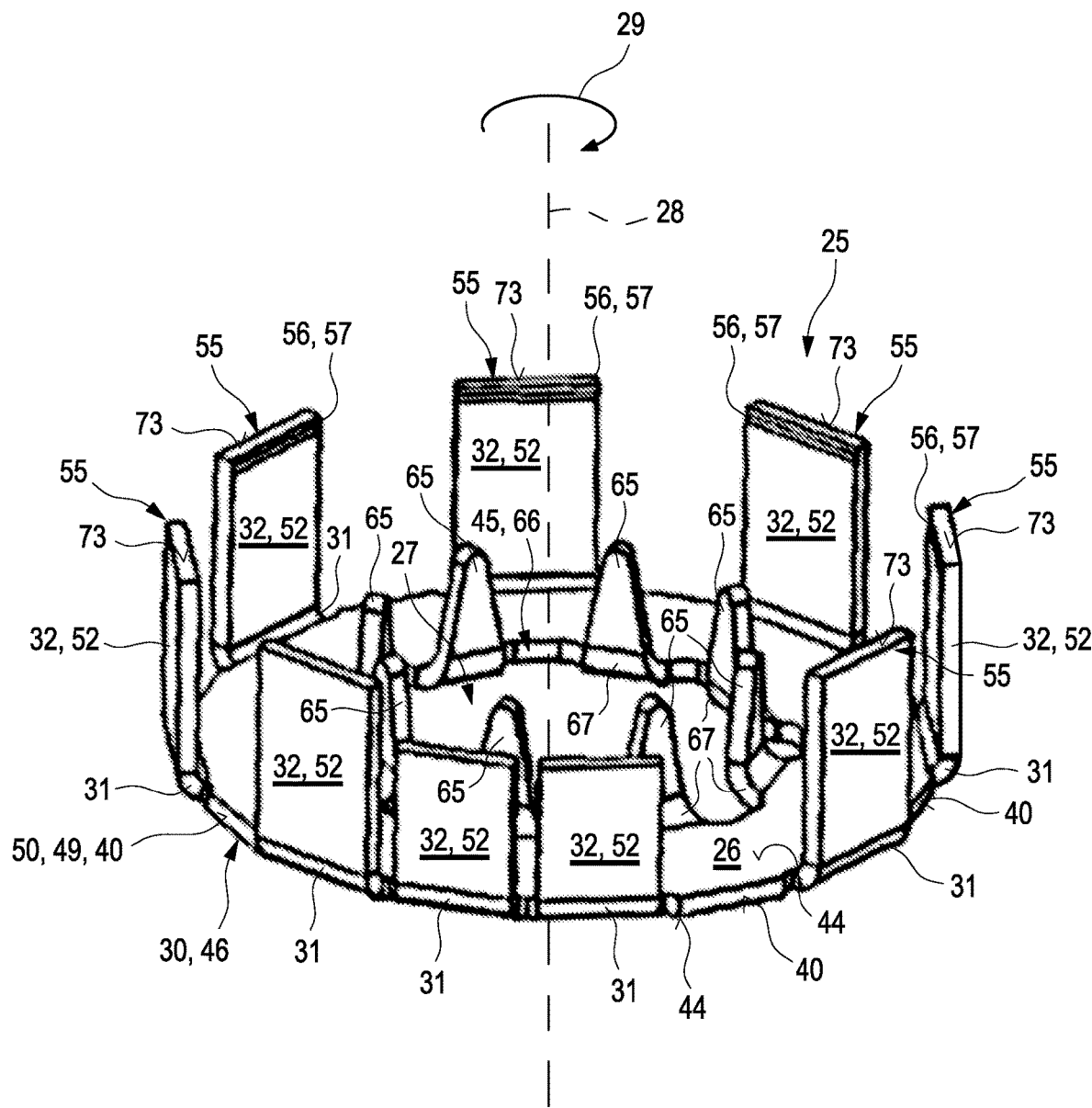

The counter-pole ring 25 of the coil assembly 1 from FIG. 1 produced from a steel plate shown in a perspective individual view in FIG. 5 is substantially constructed analogously to the pole ring 17. It has a counter-ring base plate 26, which is centrally penetrated completely by a circular counter-clearance 27. Furthermore, the counter-ring base plate 26 has multiple counter-pole ring outer teeth 32 distributed about a counter-longitudinal centre axis 28 of the counter-pole ring 25 exemplarily running centrically through the counter-clearance 27 and standing up perpendicularly with respect to the counter-ring base plate 26 arranged on a counter-outer edge 30 of the counter-ring base plate 26 oriented with respect to the counter-longitudinal centre axis 28 radially to the outside and angularly bent over on counter-fold-over outer edge regions 31 of the counter-ring base plate 26. Exemplarily, the counter-pole ring outer teeth 32, like the pole ring outer teeth 24 are bent over with respect to the counter-longitudinal centre axis 28 by approximately or exactly 90°. Each of these counter-pole ring outer teeth 32 is realised as a flat body 52, which are each integrally connected on the foot side to the counter-outer edge 30 of the counter-ring base plate 26. On the head side, they each form a free counter-tooth end 55. On the free counter-tooth ends 55 of the counter-pole ring outer teeth 32, a mounting bevel 56 each located radially inside is also provided. These mounting bevels 56 are oriented with respect to the counter-longitudinal centre axis 28, transversely, in particular at a right angle. The mounting bevels 56 can each be formed by a multi-way chamfer 57. The mounting bevels 56 facilitate the mounting of the coil assembly 1. In the region of its central counter-clearance 27, the counter-pole ring 25 comprises multiple counter-pole ring inner teeth 65, which, distributed round about the counter-longitudinal centre axis 28, are arranged on a circumferential counter-inner edge 66 of the counter-ring base plate 26 about the counter-clearance 27 oriented with respect to the counter-longitudinal centre axis 28 radially to the inside and are each angularly bent over at a counter-fold-over inner edge region 67. Exemplarily, the counter-pole ring inner teeth 65 are bent over in the same direction as the counter-pole ring outer teeth 32 and with respect to the counter-longitudinal centre axis 28 by approximately or exactly 90°. Exemplarily, deviating angles α can also be set, for example angles between the counter-pole ring inner teeth 65 and the counter-longitudinal centre axis 28 in the range greater than zero up to including 10°.

Both the pole ring outer teeth 24 and also the counter-pole ring outer teeth 32 are embodied flat, i.e. curvature-free. Equally, the pole ring inner teeth 62 and the counter-pole ring inner teeth 65 can be embodied flat, i.e. curvature-free.

In the assembled state 33 of the coil assembly 1 illustrated in FIGS. 1 and 2, the pole ring 17 and the counter-pole ring 25 are oriented coaxially to one another and to the main longitudinal centre axis 34 of the coil assembly 1, i.e. to the remaining components of the coil assembly 1 and arranged spaced apart from one another in the axial direction 35 of the main longitudinal centre axis 34. Because of this, a coil receiving space 36 is formed or delimited between them, in which the mentioned coil arrangement 2 and the coil ring carrier 6 carrying the coil arrangement 2 are arranged. Furthermore, it is noticeable in the two FIGS. 1 and 2 that the pole ring outer teeth 24 and the counter-pole ring outer teeth 32 in the assembled state 33 of the coil assembly 1 are intermeshed, wherein the pole ring outer teeth 24 are arranged in the axial direction 35 without contact on the counter-ring base plate 26 and in a radial direction 38 that is oriented transversely with respect to the main longitudinal centre axis 34 are elastically preloaded and in the radial direction 38 clamped on to the counter-ring base plate 26. In a counter-axial direction 36 that is opposite with respect to the axial direction 35, the counter-pole ring outer teeth 32 are arranged on the ring base plate 18 free of contact and elastically preloaded in the radial direction 38 and in the radial direction 38 clamped to the ring base plate 18, see also FIG. 3. The fact that the pole ring outer teeth 24 are arranged on the counter-ring base plate 26 free of contact in the axial direction 35 exemplarily means that seen in the axial direction 35 no components of the coil assembly 1, in particular of the counter-pole ring 25 or the counter-ring base plate 26 of the same, touchingly butt-up against axial front faces 72 of the pole ring outer teeth 24 or against free tooth ends 53 of the pole ring outer teeth 24. The fact that the counter-pole ring outer teeth 32 are arranged on the ring base plate 18 free of contact in the counter-axial direction 36 exemplarily means that seen in the counter-axial direction 36 no components of the coil assembly 1, in particular of the pole ring 17 or of the ring base plate 18 of the same, touchingly butt-up against counter-axial front faces 73 of the counter-pole ring outer teeth 32 or against free tooth ends 55 of the counter-pole ring outer teeth 32.

The pole ring inner teeth 62 and the counter-pole ring inner teeth 65 likewise intermesh, however, they are configured so that they touch one another neither in the axial direction 35 or counter-axial direction 36 nor in the circumferential direction. Instead, they each clampingly engage in the mentioned receiving pockets 12, 13. Because of this, the coil assembly 1 is compact and firmly mounted. Because of the fact that the pole ring outer teeth 24 and the counter-pole ring outer teeth 32 touchingly lie against the ring base plate 18 or the counter-ring base plate 26 from radially outside, i.e. laterally, the flux conducting device 16 of the coil arrangement 1 can optimally conduct or form the said magnetic field so that the coil assembly 1 is optimised with respect to its energy requirement or its efficiency. Because of this, for example the said actuation member of the valve can either be actuated relatively protective of resources or a relatively powerful actuation movement of the actuation member be achieved. Because of this, the coil assembly 1 is relatively efficient. Through this configuration, a relatively favourable mounting of the coil assembly 1 is possible, furthermore.

Figure 3:
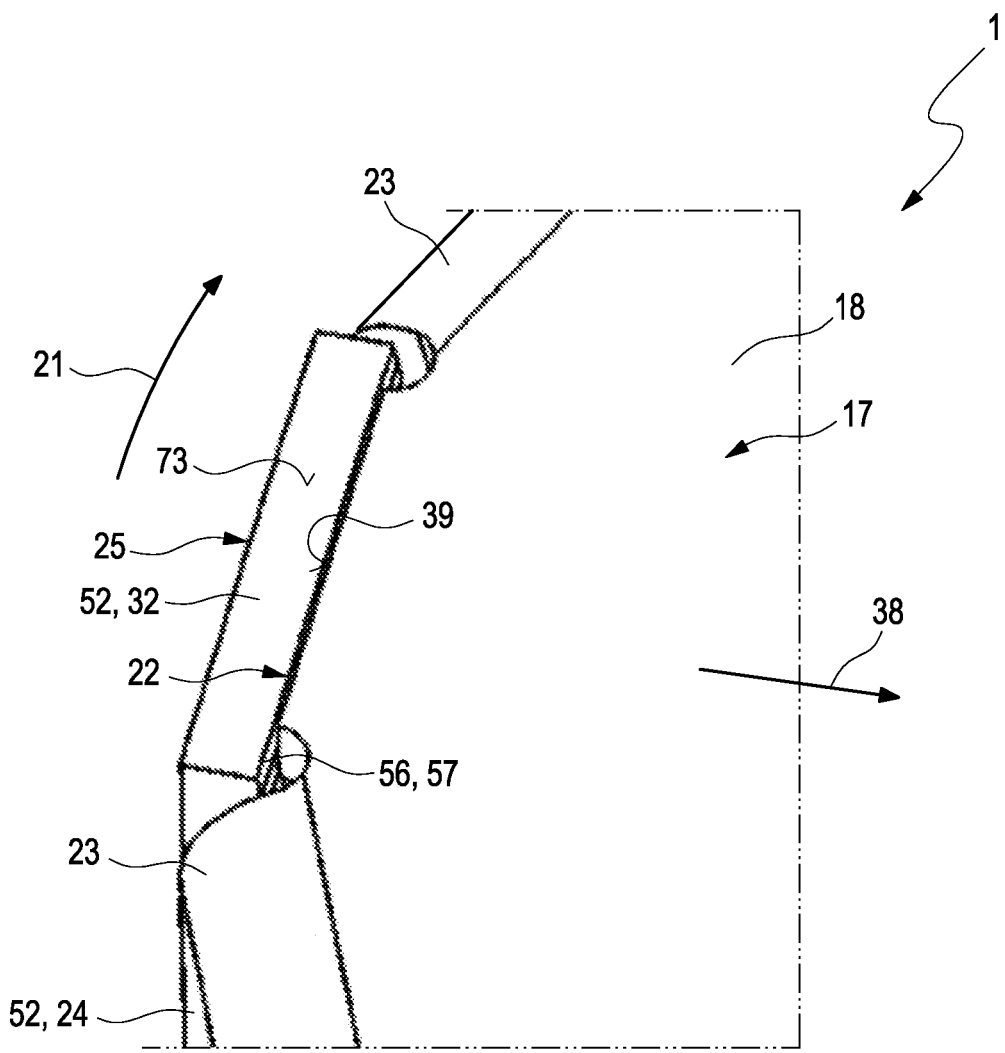

FIG. 3 shows an extract framed with dashed line of the coil assembly 1 from FIG. 1 in enlarged representation with view in the direction of an arrow III entered there. Substantially, the ring base plate 18 of the pole ring 17 is noticeable and that the counter-pole ring outer teeth 32 are clamped on to the ring base plate 18 without gap and flat between two fold-over outer edge regions 23 of the ring base plate 18 adjacent in the circumferential direction 21. It is also noticeable that between the two neighbouring fold-over outer edge regions 23 of the ring base plate 18 a clamping surface 39 is formed, on to which the counter-pole ring outer tooth 32 is clamped without gap, areally and elastically preloaded, from radially outside. Analogously to this, the counter-pole ring 25 comprises on the counter-ring base plate 26, counter-clamping surfaces 40 on which in each case a pole ring outer tooth 24 is clamped without a gap, flat and elastically preloaded, from radially outside.

Figure 6:
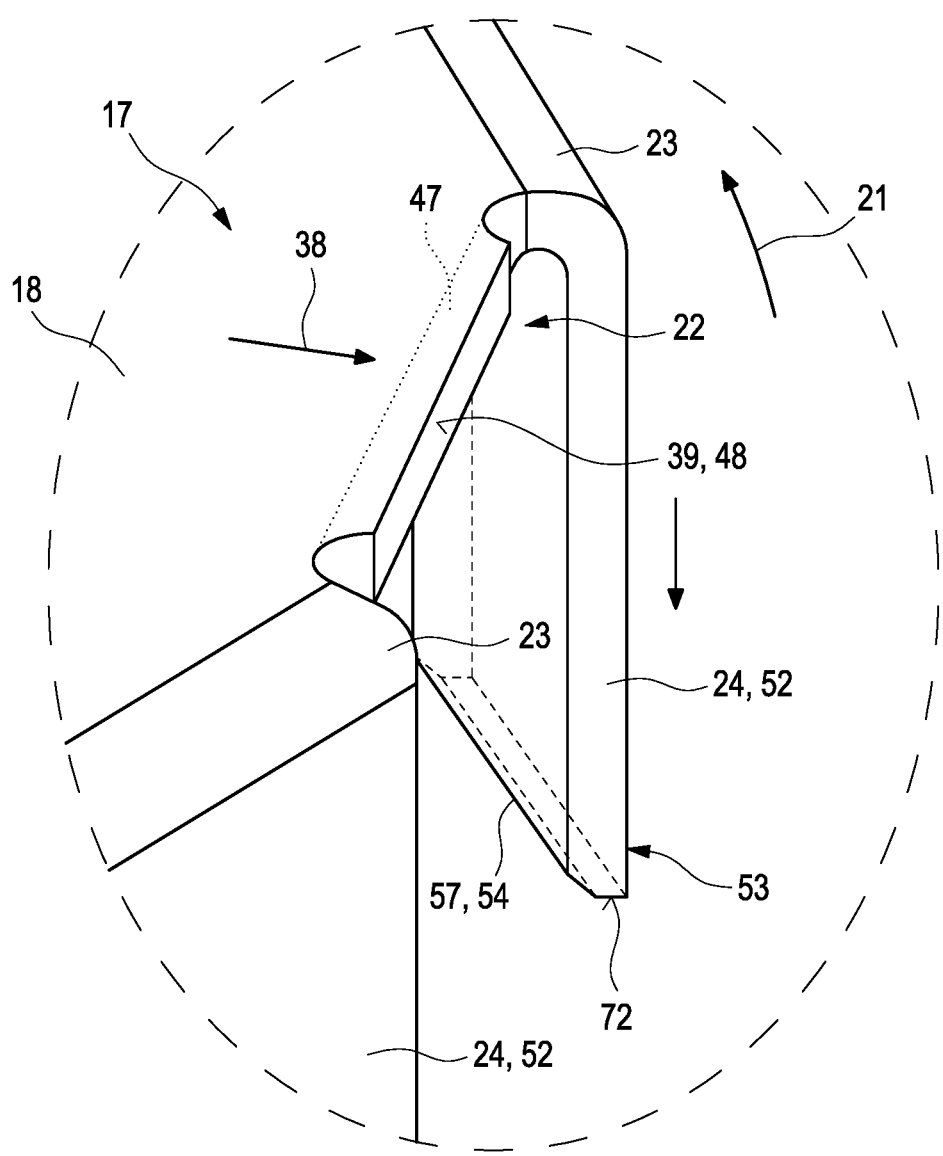

For the more accurate description of the mentioned clamping surfaces 39 and counter-clamping surfaces 40, FIG. 6 exemplarily shows an extract framed with dashed line of the pole ring 17 of the coil assembly 1 from FIG. 4 in enlarged representation and with view in the direction of an arrow VI entered there. A corresponding extract of the counter-pole ring 25 from FIG. 5 could also be utilised. At any rate, it is noticeable in FIG. 6 that between two fold-over outer edge regions 23 of the ring base plate 18 adjacent in the circumferential direction 21 a said clamping surface 39 is formed. The same is configured curvature-free, i.e. flat. In the assembled state 33 of the coil assembly 1, see FIGS. 1 and 2, this makes possible that a counter-pole ring outer tooth 32, elastically preloaded, can be clamped on from radially outside, wherein the pole ring outer teeth 24 are clamped on to a respective clamping surface 39 without a gap and areally. The same applies to the counter-pole ring 25. It has a curvature-free counter-clamping surface 40 in each case between two counter-fold-over outer edge regions 31 of the counter-ring base plate 26 adjacent in the counter-circumferential direction 29 a curvature-free counter-clamping surface 40, on to which in the assembled state 33 of the coil assembly 1 a pole ring outer tooth 24 of the pole ring 17, elastically preloaded, is clamped on from radially outside, wherein the pole ring outer teeth 24 are also clamped on to a respective counter-clamping surface 40 without gap and areally.

In FIG. 3 to 6 it is additionally noticeable that the clamping surfaces 39 project from the ring base plate 18 in the radial direction 38 towards the outside (in particular FIG. 6) and that the counter-clamping surfaces 40 project from the counter-ring base plate 26 in the radial direction 38 towards the outside (in particular FIG. 5).

The ring base plate 18 of the pole ring 17 visible in FIG. 4 exemplarily has two large ring surfaces 41 oriented in opposite direction, a circumferential inner lateral surface 42 radially inside with respect to the longitudinal centre axis 20, which forms the said inner edge 63 of the ring base plate 18, and a circumferential outer lateral surface 43 radially outside with respect to the longitudinal centre axis 20, which forms the outer edge 22 of the ring base plate 18. The said clamping surfaces 39 are now arranged on projections 47 projecting in the circumferential direction 21 between the fold-over outer edge regions 23 and in the radial direction 38 from the outer lateral surface 43 of the ring base plate 18 towards the outside, see in particular FIG. 6, wherein the clamping surfaces 39 there are each formed by front faces 48 of these projections 47 pointing in the radial direction 38 towards the outside.

Analogously to this, the counter-ring base plate 26 of the counter-pole ring 25 visible in FIG. 5 has two opposite counter-large ring surfaces 44, a circumferential counter-inner lateral surface 45 with respect to the counter-longitudinal centre axis 28 radially inside, which forms the counter-inner edge 66 of the counter-ring base plate 26, and a circumferential counter-outer lateral surface 46 with respect to the counter-longitudinal centre axis 28 radially outside, wherein the latter forms the counter-outer edge 30 of the counter-ring base plate 26. The said counter-clamping surfaces 40 are arranged analogously to the clamping surfaces 39 on counter-projections 49 projecting between the counter-fold-over outer edge regions 31 and in the radial direction 38 from the counter-outer lateral surface 46 of the counter-ring base plate 26, wherein the counter-clamping surfaces 40 there are each formed by front faces 50 of these counter-projections 49 pointing in the radial direction 38 towards the outside.

In particular in FIG. 1 it is additionally noticeable that the pole ring 17 and the counter-pole ring 25 form or delimit a common clearance 60 for the coil supply connection 58 so that the coil arrangement 2 can be electrically contacted with the coil supply connection 58 through the clearance 60. FIG. 1 additionally shows that at least the ring base plate 18 comprises a rotation positive-locking cut-out 61 penetrating the same at least in sections or completely for positioning the pole ring 17 on the coil ring carrier 6. The rotation positive-locking cut-out 61 interacts, in particular when the pole ring 17 is placed on to the coil ring carrier 6 or in the assembled state 33 of the coil assembly 1, with the coil ring carrier 6 in such a manner that the pole ring 17 is non-rotatably held on the coil ring carrier 6. By way of this, a simple anti-rotation means is achieved.

Figure 7:
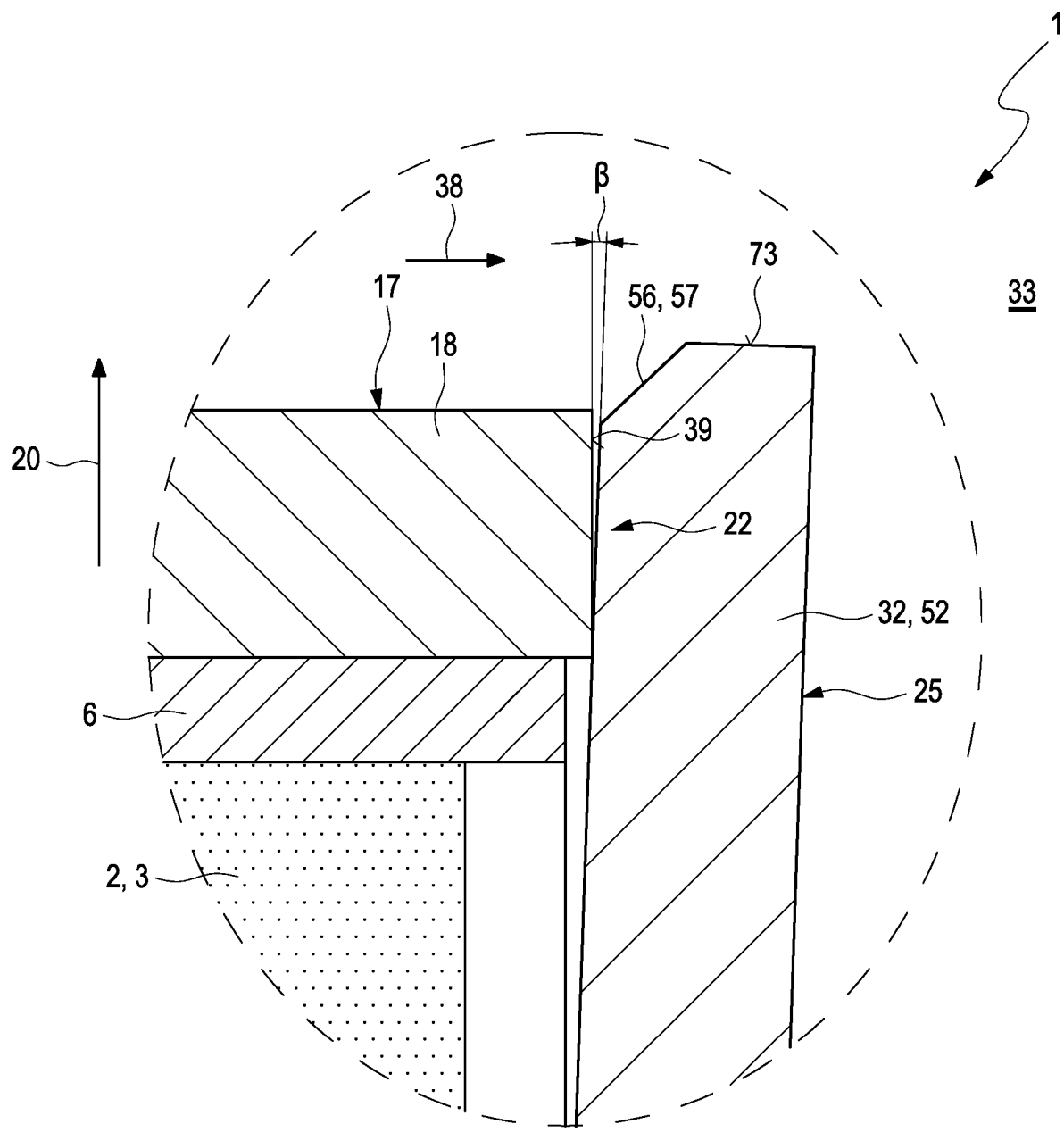

In FIG. 7, an extract VII of the coil assembly one from FIG. 2 framed with dashed line is shown in enlarged representation. It is noticeable that the pole ring outer teeth 24 and/or the counter-pole ring outer teeth 32 in the assembled state 33 of the coil assembly 1 are elastically deflected out of their state bent over with respect to the longitudinal centre axis 20 or the counter-longitudinal centre axis 28 by approximately or exactly 90°, so that the pole ring outer teeth 24 and/or the counter-pole ring outer teeth 32 are clamped in the radial direction 38 with elastic preload on to the clamping surfaces 39 of the pole ring 17 and/or the counter-clamping surfaces 40 of the counter-pole ring 25. For example, the pole ring outer teeth 24 and/or the counter-pole ring outer teeth 32 are each deflected by an angle β between themselves and the longitudinal centre axis 20 or the counter-longitudinal centre axis 28 of greater than zero up to including 5.

Figure 8:
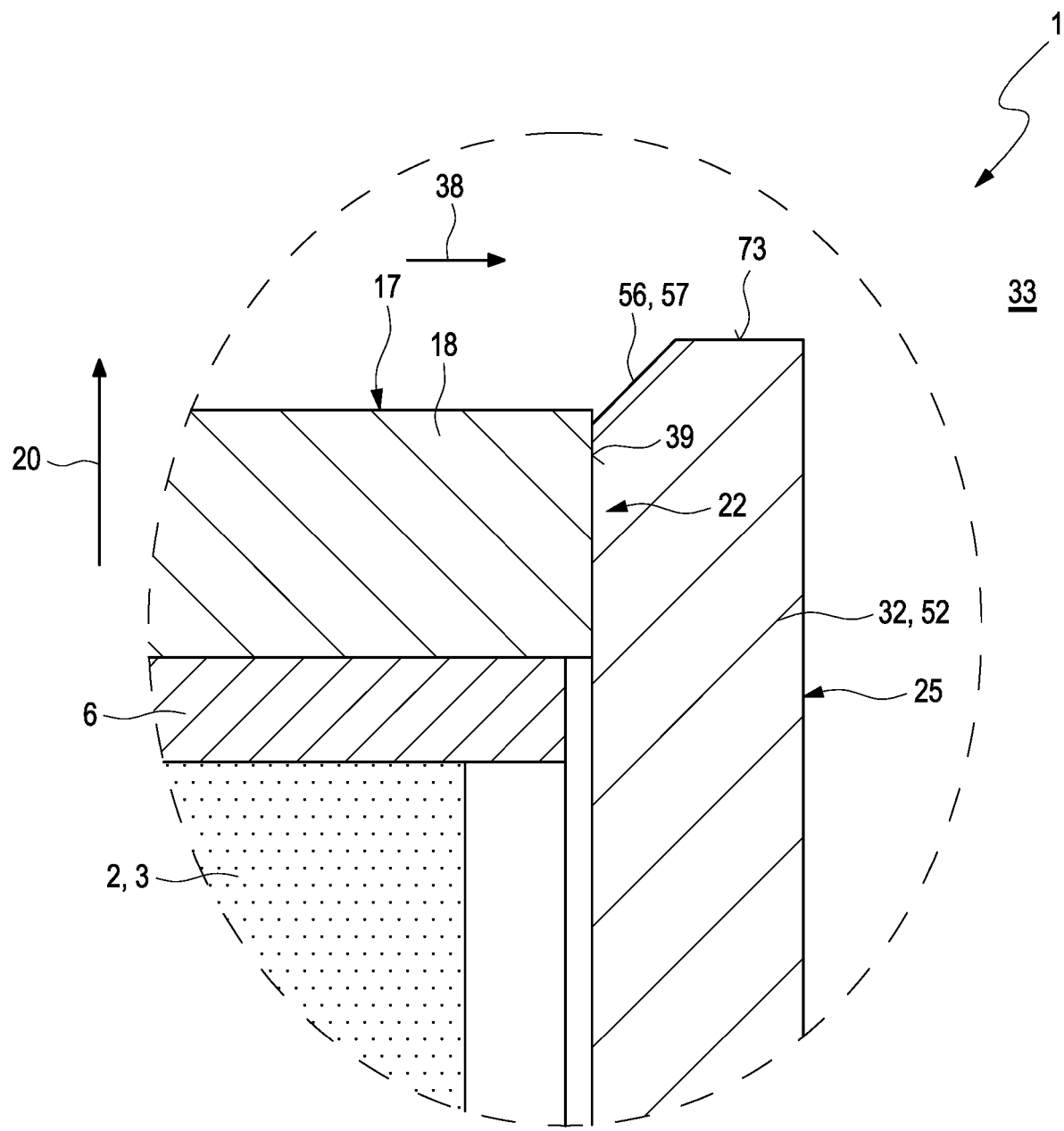

Finally, FIG. 8 shows an extract as in FIG. 7, however this is a further preferred exemplary embodiment of a coil assembly 1. It is characterised in that the pole ring outer teeth 24 and the counter-pole ring outer teeth 32 are bent over exactly by 90° to the ring base plate 18 or to the counter-ring base plate 26 and that in the assembled state 33 of the coil assembly 1 no elastic deflection of the pole ring outer teeth 24 and of the counter-pole ring outer teeth 32 has taken place, so that they run quasi-parallel to the longitudinal centre axis 20 or counter-longitudinal centre axis 28. Because of this, the pole ring 17 and the counter-pole ring 25 can be practically mounted without joining force and laterally clampingly lie flat, in particular over the full surface area, against the respective outer edges of the respective ring base plates.

Figure 9:
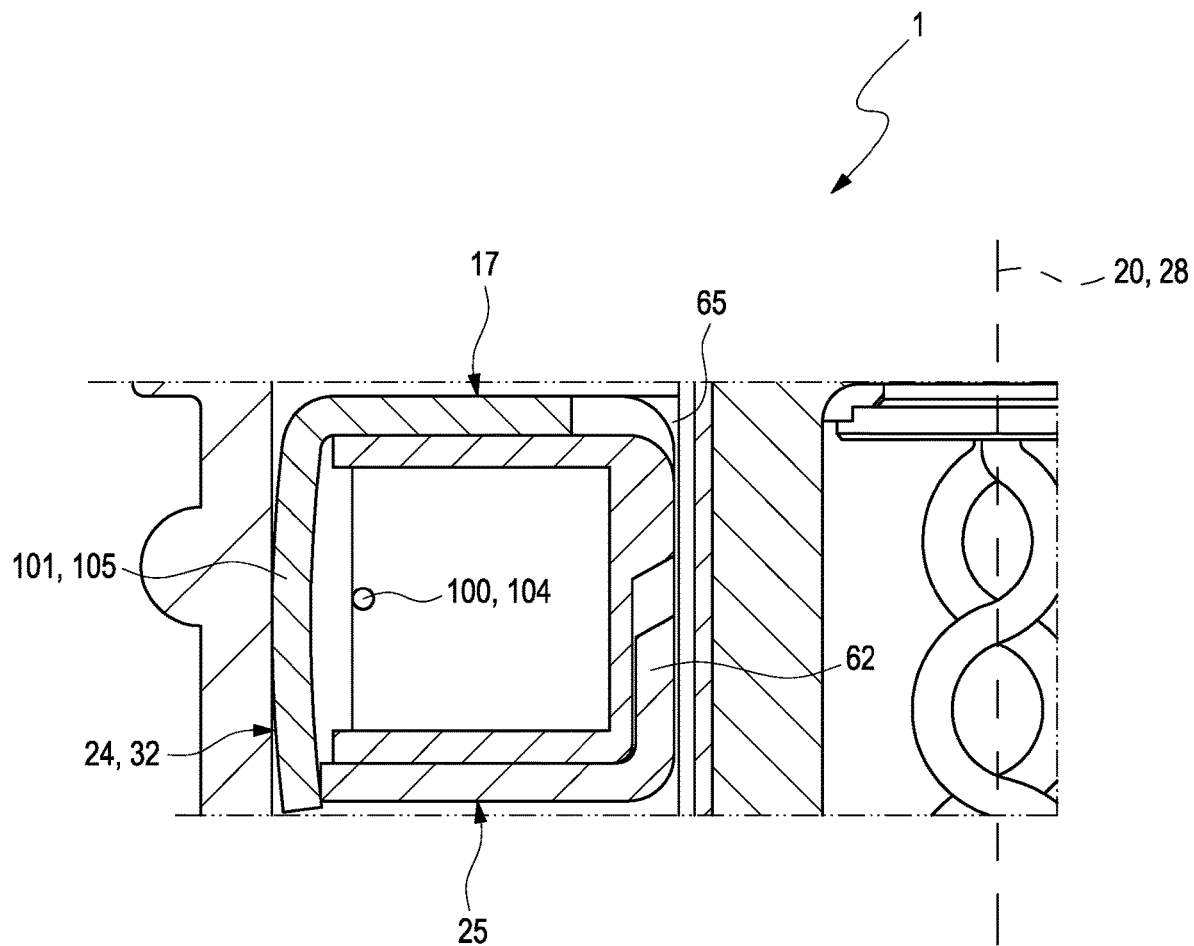

Finally, FIG. 9 shows a further embodiment of a coil assembly 1 according to the invention in an installation situation not described in more detail, which is largely identical with the embodiments described above. In contrast with the preceding embodiments, the pole ring outer teeth 24 however each have a curvature 101 embodied about a curvature axis 100. These curvature axes 100, of which in FIG. 9 a single one is realised in plan view and therefore as a dot, are each oriented at a right angle with respect to the longitudinal centre axis 20 of the pole ring 17. The pole ring inner teeth 62 could each also have a curvature or arch embodied about a curvature inner axis, wherein the said curvature inner axes would then each be oriented at a right angle with respect to the longitudinal centre axis 20 of the pole ring 17, however this is not embodied here. Furthermore, the counter-pole ring outer teeth 32 in contrast with the preceding embodiments each have a curvature 105 embodied about a counter-curvature axis 104. The said counter-curvature axes 104 are oriented with respect to the counter-longitudinal centre axis 28 of the counter-pole ring 25 at a right angle. Furthermore, the counter-pole ring inner teeth 65 could each also have a curvature embodied about a counter-curvature inner axis, wherein the said counter-curvature inner axes would each be oriented at a right angle with respect to the counter-longitudinal centre axis 28 of the counter-pole ring 25 even if this is not embodied here.

The invention claimed is:

1. A coil assembly, comprising:
a coil arrangement including at least one electrically energizable coil, a coil ring carrier receiving the coil arrangement and a flux conducting device for conducting magnetic field lines of a magnetic field provided via the coil arrangement,
the flux conducting device including a one-piece ferromagnetic pole ring that includes a ring base plate and a plurality of pole ring outer teeth distributed in a circumferential direction round about a longitudinal centre axis of the one-piece ferromagnetic pole ring and are arranged on an outer edge of the ring base plate oriented with respect to the longitudinal centre axis radially to an outside, the plurality of pole ring outer teeth angularly bent over on fold-over outer edge regions of the ring base plate,
the flux conducting device further including a one-piece ferromagnetic counter-pole ring that includes a counter-ring base plate and a plurality of counter-pole ring outer teeth distributed in a counter-circumferential direction round about a counter-longitudinal centre axis of the one-piece ferromagnetic counter-pole ring, the plurality of counter-pole ring outer teeth arranged on a counter-outer edge of the counter-ring base plate oriented with respect to the counter-longitudinal centre axis radially to the outside and angularly bent over on counter-fold-over outer edge regions of the counter-ring base plate,
wherein in an assembled state the one-piece ferromagnetic pole ring and the one-piece ferromagnetic counter-pole ring are oriented coaxially to one another and to a main longitudinal centre axis and are arranged longitudinally spaced apart in an axial direction of the main longitudinal centre axis, so that between the one-piece ferromagnetic pole ring and the one-piece ferromagnetic counter-pole ring a coil receiving ring space is provided, in which the coil arrangement and the coil ring carrier are arranged,
wherein the plurality of pole ring outer teeth and the plurality of counter-pole ring outer teeth engage into one another in the assembled state, such that:
the plurality of pole ring outer teeth are arranged on the counter-ring base plate without contacting the counter-ring base plate in the axial direction and, elastically preloaded, are laterally clamped on to the counter-ring base plate in a radial direction oriented transversely relative to the main longitudinal centre axis, and
the plurality of counter-pole ring outer teeth are arranged on the ring base plate without contacting the ring base plate in a counter-axial direction that is opposite with respect to the axial direction and, elastically preloaded, are clamped on to the ring base plate in the radial direction.

2. The coil assembly according to claim 1, wherein at least one of:
the plurality of pole ring outer teeth are clamped on to the counter-ring base plate without gap and the plurality of pole ring outer teeth being linearly or areally abutted against the counter-ring base plate on a radially inner side of the plurality of pole ring outer teeth, and
the plurality of counter-pole ring outer teeth are clamped on to the ring base plate without gap and the plurality of counter-pole ring outer teeth being linearly or areally abutted against the ring base plate on a radially inner side of the plurality of counter-pole ring outer teeth.

3. The coil assembly according to claim 1, wherein at least one of:
between two fold-over outer edge regions of the ring base plate that are adjacent in the circumferential direction, a curvature-free clamping surface is provided, on to which in the assembled state a counter-pole ring outer tooth of the plurality of counter-pole ring outer teeth is clamped, and
between two counter-fold-over outer edge regions of the counter-ring base plate adjacent in the counter-circumferential direction, a curvature-free counter-clamping surface is provided, on which in the assembled state a pole ring outer tooth of the plurality of pole ring outer teeth is clamped.

4. The coil assembly according to claim 3, wherein at least one of:
the plurality of pole ring outer teeth are clamped on to a respective counter-clamping surface without gap and being linearly or areally abutted against the respective counter-clamping surface, and
the plurality of counter-pole ring outer teeth are clamped on to a clamping surface without gap and being linearly or areally abutted against the clamping surface.

5. The coil assembly according to claim 3, wherein at least one of:
the clamping surface projects from the ring base plate in the radial direction radially to the outside, and
the counter-clamping surface projects from the counter-ring base plate in the radial direction to the outside.

6. The coil assembly according to claim 1, wherein:
the ring base plate has two opposite large ring surfaces, a circumferential inner lateral surface with respect to the longitudinal centre axis radially inside and a circumferential outer lateral surface with respect to the longitudinal centre axis radially outside, wherein the circumferential outer lateral surface forms the outer edge of the ring base plate,
the counter-ring base plate has two opposite counter-large ring surfaces, a circumferential counter-inner lateral surface with respect to the counter-longitudinal centre axis radially inside and a circumferential counter-outer lateral surface with respect to the counter-longitudinal centre axis radially outside, wherein the circumferential counter-outer lateral surface forms the counter-outer edge of the counter-ring base plate,
a clamping surface provided between two fold-over edge regions of the ring base plate adjacent in the circumferential direction is arranged on a projection projecting in the circumferential direction between the two fold-over outer edge regions and from the outer lateral surface of the ring base plate in the radial direction to the outside, wherein the clamping surface is formed by a front face of the projection pointing in the radial direction to the outside, and
a counter-clamping surface provided between two counter-fold-over outer edge regions of the counter ring base plate adjacent in the counter-circumferential direction is arranged on a counter-projection projecting in the counter-circumferential direction between the two counter-fold-over outer edge regions and in the radial direction from the counter-outer lateral surface of the counter-ring base plate, wherein the counter-clamping surface is formed by a front face of the counter-projection pointing in the radial direction to the outside.

7. The coil assembly according to claim 1, wherein the plurality of pole ring outer teeth and the plurality of counter-pole ring outer teeth are each structured curvature-free.

8. The coil assembly according to claim 1, wherein in the assembled state the plurality of pole ring outer teeth protrude in the axial direction over the counter-ring base plate and the plurality of counter-pole ring outer teeth in the counter-axial direction over the ring base plate.

9. The coil assembly according to claim 1, wherein at least one of:
the plurality of pole ring outer teeth on a foot side are integrally connected to the outer edge of the ring base plate and on a head side comprise a free tooth end, which in the radial direction inside comprises a mounting bevel, and
the plurality of counter-pole ring outer teeth on a foot side are integrally connected to the counter-outer edge of the counter-ring base plate and on a head side comprise a free counter-tooth end, which in the radial direction inside comprises a mounting bevel.

10. The coil assembly according to claim 9, wherein in the assembled state at least one of (i) the mounting bevel of the plurality of pole ring outer teeth protrude in the axial direction over the counter-ring base plate and (ii) the mounting bevel of the plurality of counter-pole ring outer teeth protrude in the counter-axial direction over the ring base plate.

11. The coil assembly according to claim 1, wherein at least one of the pole ring and the counter-pole ring comprise a clearance for a coil supply connection for an energy supply of the coil arrangement.

12. The coil assembly according to claim 1, wherein the ring base plate comprises a rotation positive-locking cut-out penetrating the ring base plate at least in sections for positioning the pole ring on the coil ring carrier, wherein the rotation positive-locking cut-out, when the pole ring is placed on to the coil ring carrier or in the assembled state, interacts with the coil ring carrier such that the pole ring is non-rotatably held on the coil ring carrier.

13. The coil assembly according to claim 1, wherein:
the pole ring in a region of a central clearance comprises a plurality of pole ring inner teeth distributed in the circumferential direction round about the longitudinal centre axis, wherein the plurality of pole ring inner teeth are arranged on an inner edge of the ring base plate which with respect to the longitudinal centre axis is oriented radially towards the inside and are each angularly bent over on a fold-over inner edge region, and
the counter-pole ring in a region of a central counter-clearance comprises a plurality of counter-pole ring inner teeth distributed in the counter-circumferential direction round about the counter-longitudinal centre axis, wherein the plurality of counter-pole ring inner teeth are arranged on a counter-inner edge of the counter-ring base plate which with respect to the counter-longitudinal centre axis is oriented radially towards the inside, and are each angularly bent over on a counter-fold-over inner edge region.

14. The coil assembly according to claim 13, wherein one of:
the plurality of pole ring inner teeth are parallel with respect to the longitudinal centre axis,
between the plurality of pole ring inner teeth and the longitudinal centre axis angles in the range greater than zero up to including 10° are defined,
the counter-pole ring inner teeth are parallel with respect to the counter-longitudinal centre axis, or
between the counter-pole ring inner teeth and the counter-longitudinal centre axis angles in the range greater than zero up to including 10° are defined.

15. The coil assembly according to claim 1, wherein at least one of:
the plurality of pole ring outer teeth each comprise a curvature or arch disposed about a curvature axis, wherein the curvature axes are each oriented at a right angle with respect to the longitudinal centre axis of the pole ring,
a plurality of pole ring inner teeth disposed on the pole ring each comprise a curvature or arch disposed about a curvature inner axis, wherein the curvature inner axes are each oriented at a right angle with respect to the longitudinal centre axis of the pole ring,
the plurality of counter-pole ring outer teeth each comprise a curvature or arch disposed about a counter-curvature axis, wherein the counter-curvature axes are each oriented at a right angle with respect to the counter-longitudinal centre axis of the counter-pole ring, and
a plurality of counter-pole ring inner teeth disposed on the counter-pole ring each comprise a curvature or arch disposed about a counter-curvature inner axis, wherein the counter-curvature axes are each oriented at a right angle with respect to the counter-longitudinal centre axis of the counter-pole ring.

16. A valve, comprising:
an actuation device,
the actuation device including a coil assembly and an actuation member that is driveable via the coil assembly to perform a linear or rotary operating movement, wherein the coil assembly includes:
a coil arrangement including at least one electrically energizable coil, a coil ring carrier receiving the coil arrangement and a flux conducting device for conducting magnetic field lines of a magnetic field provided via the coil arrangement,
the flux conducting device including a one-piece ferromagnetic pole ring that includes a ring base plate and a plurality of pole ring outer teeth distributed in a circumferential direction round about a longitudinal centre axis of the one-piece ferromagnetic pole ring and arranged on an outer edge of the ring base plate oriented with respect to the longitudinal centre axis radially to an outside, the plurality of pole ring outer teeth angularly bent over on fold-over outer edge regions of the ring base plate,
the flux conducting device further including a one-piece ferromagnetic counter-pole ring that includes a counter-ring base plate and a plurality of counter-pole ring outer teeth distributed in a counter-circumferential direction round about a counter-longitudinal centre axis of the one-piece ferromagnetic counter-pole ring, the plurality of counter-pole ring outer teeth arranged on a counter-outer edge of the counter-ring base plate oriented with respect to the counter-longitudinal centre axis radially to the outside and angularly bent over on counter-fold-over outer edge regions of the counter-ring base plate,
wherein in an assembled state of the coil assembly the one-piece ferromagnetic pole ring and the one-piece ferromagnetic counter-pole ring are oriented coaxially to one another and to a main longitudinal centre axis of the coil assembly and are arranged longitudinally spaced apart in an axial direction of the main longitudinal centre axis, so that between the one-piece ferromagnetic pole ring and the one-piece ferromagnetic counter-pole ring a coil receiving ring space is provided, in which the coil arrangement and the coil ring carrier are arranged, wherein the plurality of pole ring outer teeth and the plurality of counter-pole ring outer teeth engage into one another in the assembled state, such that:

the plurality of pole ring outer teeth are arranged on the counter-ring base plate without contacting the counter-ring base plate in the axial direction and, elastically preloaded, are laterally clamped on to the counter-ring base plate in a radial direction oriented transversely relative to the main longitudinal centre axis, and the plurality of counter-pole ring outer teeth are arranged on the ring base plate without contacting the ring base plate in a counter-axial direction that is opposite with respect to the axial direction and, elastically preloaded, are clamped on to the ring base plate in the radial direction.

17. The valve according to claim 16, wherein at least one of:

the plurality of pole ring outer teeth are clamped on to the counter-ring base plate without gap and being linearly or areally abutted against the counter-ring base plate; and the plurality of counter-pole ring outer teeth are clamped on to the ring base plate without gap and being linearly or areally abutted against the ring base plate.

18. The valve according to claim 16, wherein between two fold-over outer edge regions of the ring base plate that are adjacent in the circumferential direction, a curvature-free clamping surface is provided, on to which in the assembled state a counter-pole ring outer tooth of the plurality of counter-pole ring outer teeth is clamped.

19. The valve according to claim 16, wherein between two counter-fold-over outer edge regions of the counter-ring base plate adjacent in the counter-circumferential direction, a curvature-free counter-clamping surface is provided, on which in the assembled state a pole ring outer tooth of the plurality of pole ring outer teeth is clamped.

20. A coil assembly, comprising:

a coil arrangement including at least one electrically energizable coil, a coil ring carrier receiving the coil arrangement and a flux conducting device for conducting magnetic field lines of a magnetic field provided via the coil arrangement, the flux conducting device including a one-piece ferromagnetic pole ring that includes a ring base plate and a plurality of pole ring outer teeth distributed in a circumferential direction round about a longitudinal centre axis of the one-piece ferromagnetic pole ring and are arranged on an outer edge of the ring base plate oriented with respect to the longitudinal centre axis radially to an outside, the plurality of pole ring outer teeth angularly bent over on fold-over outer edge regions of the ring base plate, the flux conducting device further including a one-piece ferromagnetic counter-pole ring that includes a counter-ring base plate and a plurality of counter-pole ring outer teeth distributed in a counter-circumferential direction round about a counter-longitudinal centre axis of the one-piece ferromagnetic counter-pole ring, the plurality of counter-pole ring outer teeth arranged on a counter-outer edge of the counter-ring base plate oriented with respect to the counter-longitudinal centre axis radially to the outside and angularly bent over on counter-fold-over outer edge regions of the counter-ring base plate, wherein in an assembled state the one-piece ferromagnetic pole ring and the one-piece ferromagnetic counter-pole ring are oriented coaxially to one another and to a main longitudinal centre axis and are arranged longitudinally spaced apart in an axial direction of the main longitudinal centre axis, so that between the one-piece ferromagnetic pole ring and the one-piece ferromagnetic counter-pole ring a coil receiving ring space is provided, in which the coil arrangement and the coil ring carrier are arranged, wherein the plurality of pole ring outer teeth and the plurality of counter-pole ring outer teeth engage into one another in the assembled state, such that:

the plurality of pole ring outer teeth are arranged on the counter-ring base plate without contacting the counter-ring base plate in the axial direction and, elastically preloaded, are laterally clamped on to the counter-ring base plate in a radial direction oriented transversely relative to the main longitudinal centre axis, and the plurality of counter-pole ring outer teeth are arranged on the ring base plate in a counter-axial direction that is opposite with respect to the axial direction and, elastically preloaded, are clamped on to the ring base plate in the radial direction; and wherein at least one of:

the plurality of pole ring outer teeth each comprise a curvature or arch disposed about a curvature axis, wherein the curvature axes are each oriented at a right angle with respect to the longitudinal centre axis of the pole ring, a plurality of pole ring inner teeth disposed on the pole ring each comprise a curvature or arch disposed about a curvature inner axis, wherein the curvature inner axes are each oriented at a right angle with respect to the longitudinal centre axis of the pole ring, the plurality of counter-pole ring outer teeth each comprise a curvature or arch disposed about a counter-curvature axis, wherein the counter-curvature axes are each oriented at a right angle with respect to the counter-longitudinal centre axis of the counter-pole ring, and a plurality of counter-pole ring inner teeth disposed on the counter-pole ring each comprise a curvature or arch disposed about a counter-curvature inner axis, wherein the counter-curvature axes are each oriented at a right angle with respect to the counter-longitudinal centre axis of the counter-pole ring.

* * * * *